Figure 2:
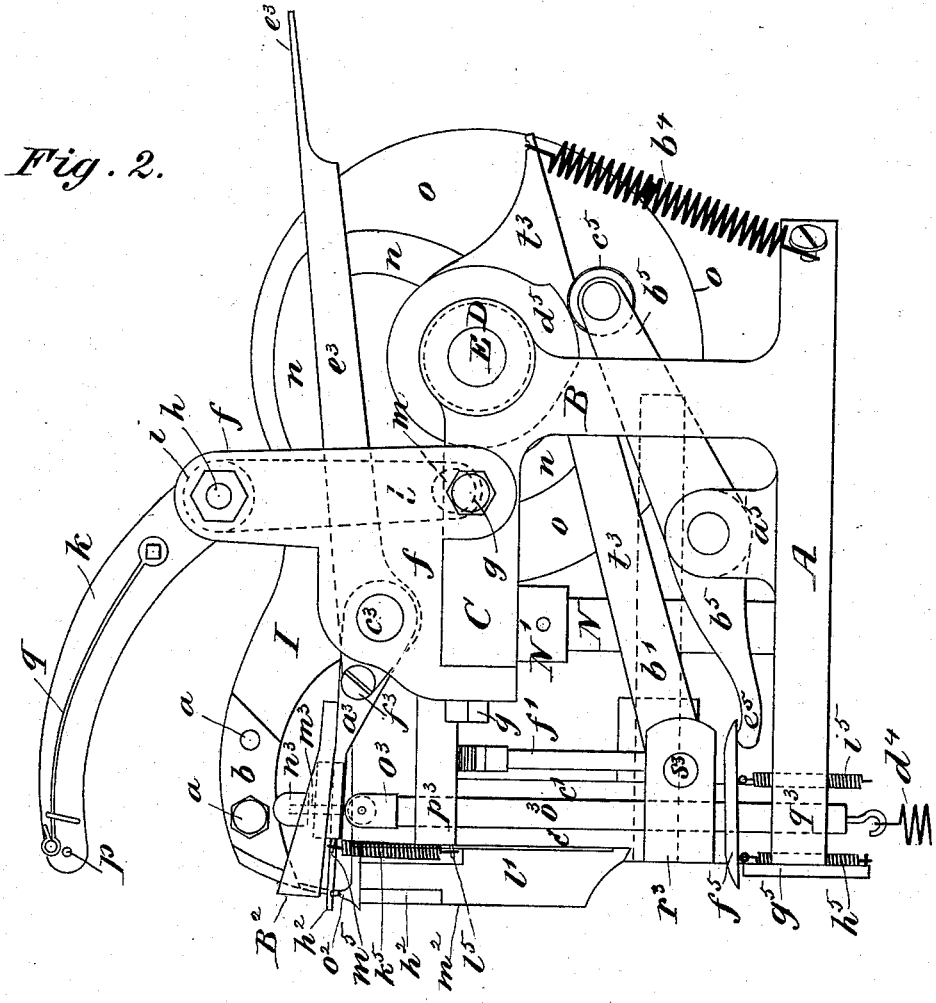

(No Model.) 6 Sheets—Sheet 1.
M. H. PEARSON.
BOOT AND SHOE SEWING MACHINE.
No. 267,798. Patented Nov. 21, 1882.
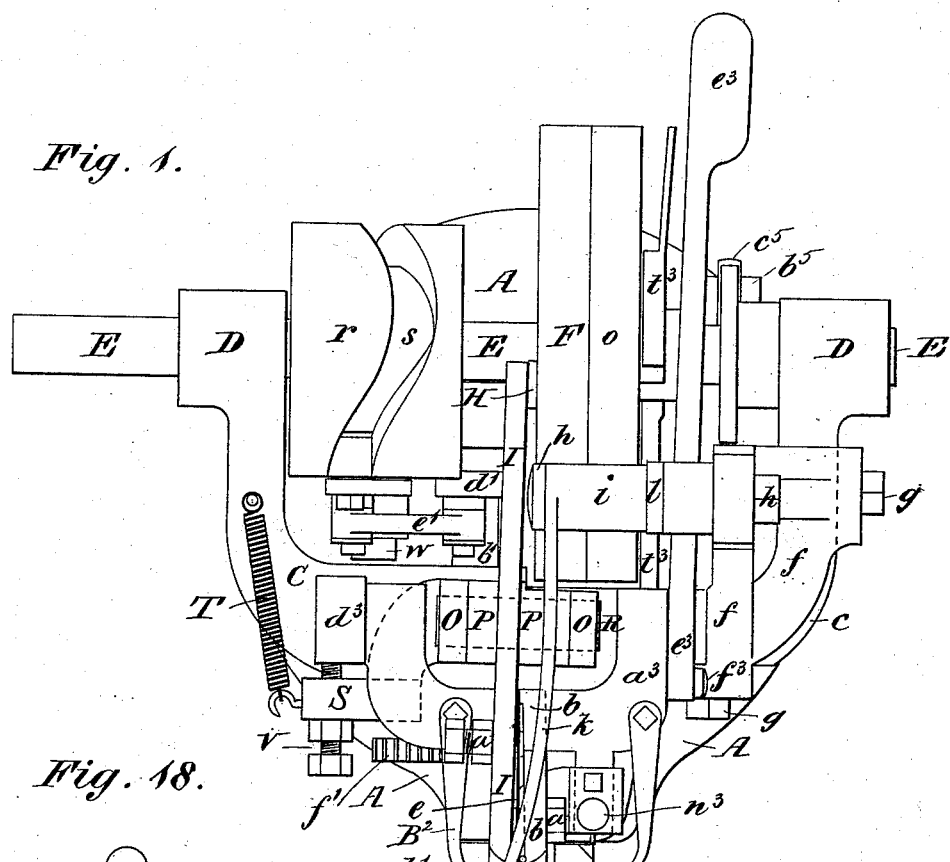
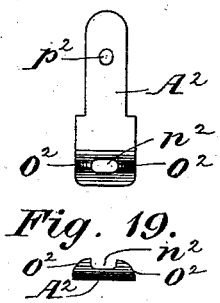
Witnesses
J. L. Marien
W. H. Barnett
Inventor
M. H. Pearson
By his Attorney
Charles G. C. Simpson (No Model.)  
6 Sheets—Sheet 2.

M. H. PEARSON.
BOOT AND SHOE SEWING MACHINE.

No. 267,798. Patented Nov. 21, 1882.

Witnesses  
Inventor  
M. H. Pearson  
By his attorney  
Charles G. C. Simpson (No Model.)
M. H. PEARSON.
BOOT AND SHOE SEWING MACHINE.
No. 267,798. Patented Nov. 21, 1882.
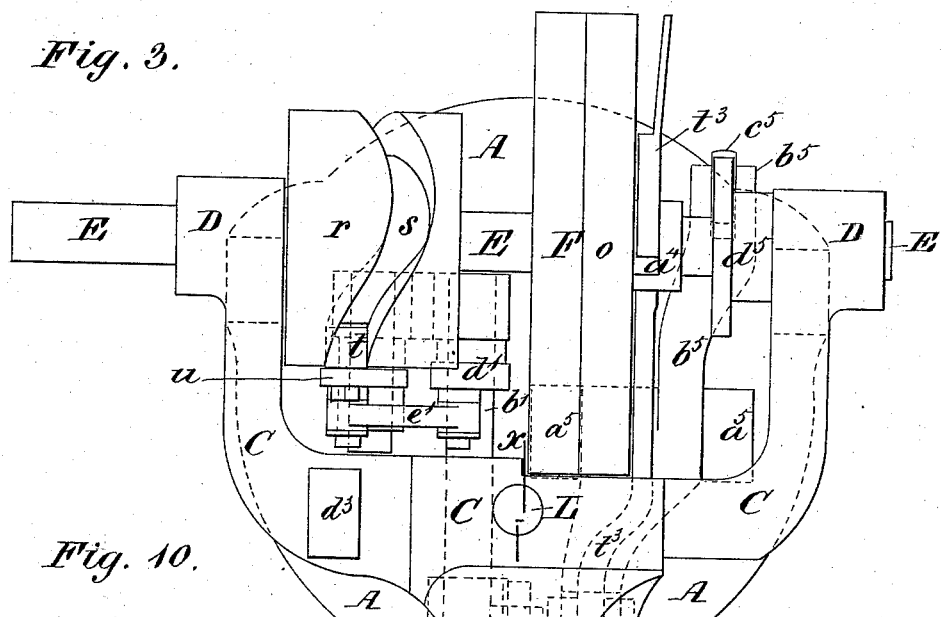
Fig. 3.
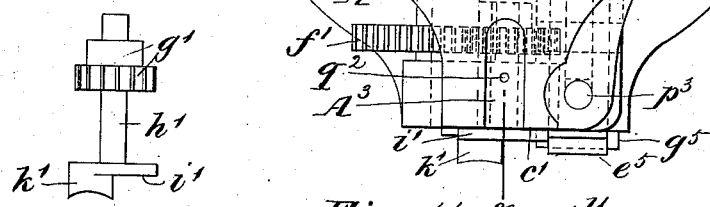
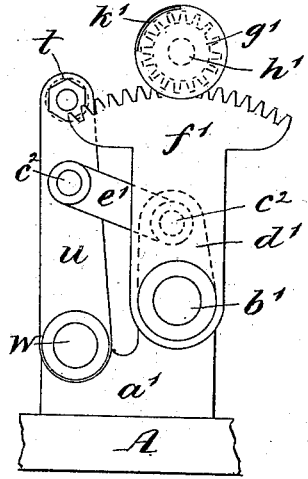
Fig. 10.
Fig. 9.
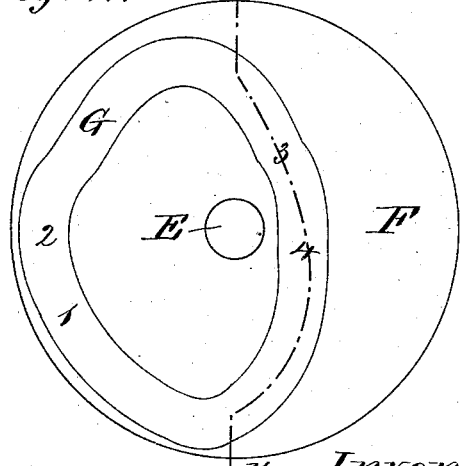
Fig. 11.
Witnesses
Inventor
M. H. Pearson
By his Attorney
Charles C. Simpson (No Model.)

M. H. PEARSON.

BOOT AND SHOE SEWING MACHINE.

No. 267,798. Patented Nov. 21, 1882.

6 Sheets—Sheet 4.

Witnesses

Inventor
M. H. Pearson
By his Attorney
Charles G. C. Simpson (No Model.) 6 Sheets—Sheet 5.
M. H. PEARSON.
BOOT AND SHOE SEWING MACHINE.
No. 267,798. Patented Nov. 21, 1882.
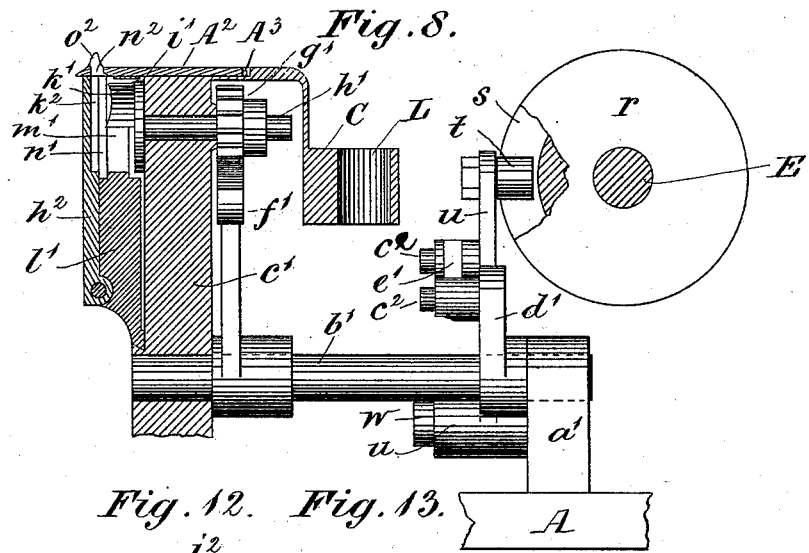
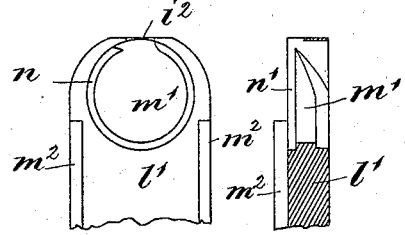
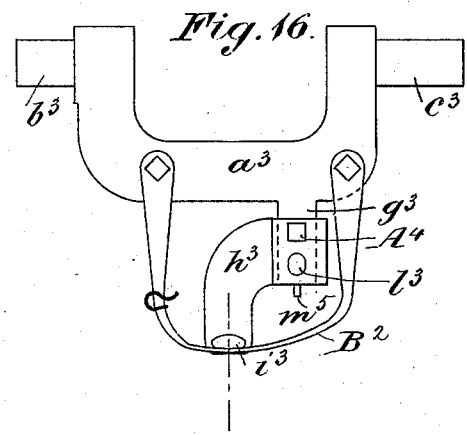
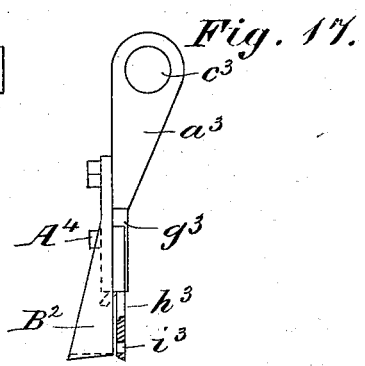
Witnesses
J. H. Marvin
W. H. Barnett.
Inventor
M. H. Pearson
By his attorney
Charles G. C. Simpson (No Model.) 6 Sheets—Sheet 6.

M. H. PEARSON.
BOOT AND SHOE SEWING MACHINE.

No. 267,798. Patented Nov. 21, 1882.

Witnesses
H. Ducondu
C. Dickson

Inventor
Marshall H. Pearson
By his Attorney
Charles G. Simpson

UNITED STATES PATENT OFFICE.

MARSHALL H. PEARSON, OF LEEDS, COUNTY OF YORK, ENGLAND.

BOOT AND SHOE SEWING MACHINE.

SPECIFICATION forming part of Letters Patent No. 267,798, dated November 21, 1882.

Application filed July 17, 1882. (No model.) Patented in England August 12, 1880, No. 3,294.

*To all whom it may concern:*

Be it known that I, MARSHALL HENRY PEARSON, of Leeds, in the county of York, in that part of the Kingdom of Great Britain called England, have invented certain new and useful Improvements in Boot and Shoe Sewing Machines; and I do hereby declare that the following is a full, clear, and exact description of the same.

This invention has reference to that class of sewing-machines used for what is known as "fair stitching," or machines for sewing the outsoles of boots and shoes to the welt or middle sole; and the improvements relate principally, with other things, which will be hereinafter fully described and claimed—

First, to the arrangement of a curved needle mounted on the end of a lever, which lever is pivoted on the top of or above a vertical pivot-post, which receives a rotary reciprocating motion on its axis, thus enabling the needle-lever to turn laterally or transversely to its motion for causing the stitching, by which lateral movement the work is fed or moved forward without any other mechanism for this purpose. Such movement takes place after the completion of the needle's downward stroke, and while it is stationary and the shuttle (which will be hereinafter described) is taking the needle-thread for the purpose of locking it with its own. The above-mentioned transverse or radial reciprocating motion may be caused by cams, or, as hereinafter described, by providing a cam-groove in a revolving body, so that it imparts to the needle-lever the required motion to oscillate vertically to form the stitches, and, by further forming the said cam-groove of varying depth, it also imparts to the said lever the motion to move forward or feed the work being stitched.

Secondly. The shuttle is of a circular form, hollowed out to receive the cop of thread required for sewing. On the periphery of the shuttle is provided a point or projection for taking hold of the needle-thread. A rotary reciprocating motion is imparted thereto from a cam and transmitted through a toothed sector or segment and gearing. The recess in the shuttle is covered by a suitable lid, on the front of which is provided a face cam or projection, in which is formed a hole. Through this the shuttle-thread issues. The object of the face-cam is to operate at suitable times upon the needle and shuttle threads alternately for separating them while passing each other. This arrangement has the effect of preventing the shuttle-thread being caught by the point or projection on the shuttle.

Thirdly. The presser-foot, which is employed for holding down the leather, &c., while being sewed, is attached to the end of an arm or lever mounted in suitable bearings concentric or nearly concentric with the center upon which the needle-lever moves. The presser-foot is held down on the work by a powerful spring, and relieved only by a tappet arrangement when the feed-motion is brought into operation.

In the drawings hereunto annexed similar letters of reference indicate like parts.

Figure 4:
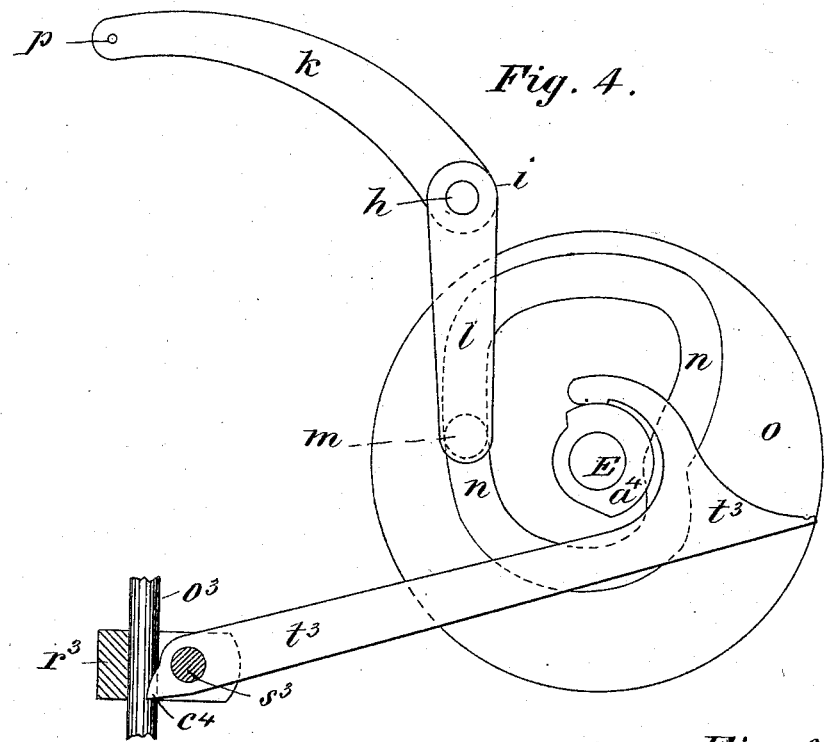
Figures 5, 6:
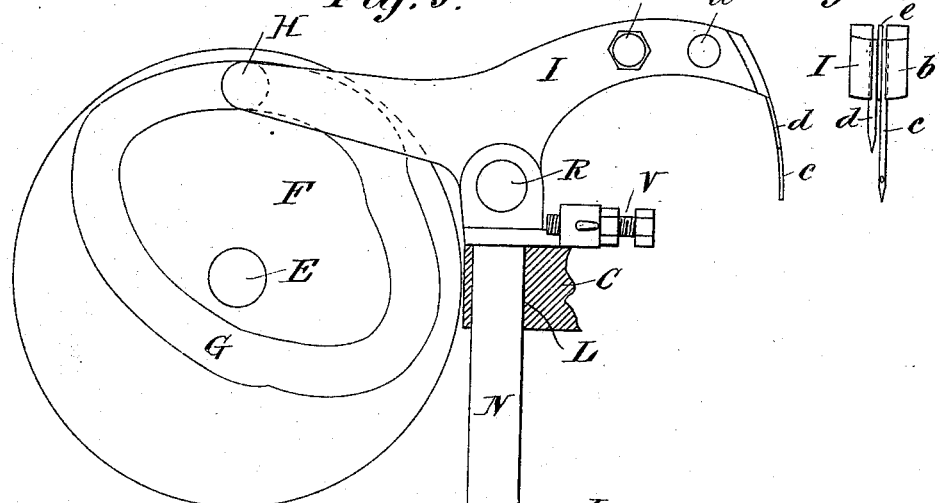
Figure 14:
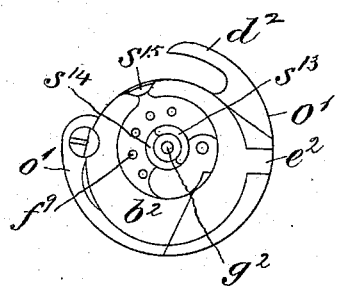
Figure 15:
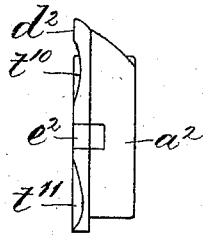

Figure 1 is a plan of a machine embodying my invention. Fig. 2 is a side elevation of Fig. 1. Fig. 3 is a plan of the machine, having the upper working parts removed to show more clearly the lower or actuating parts. Fig. 4 is a side elevation of the thread-lever and cam by which it is operated, also showing cam and lever by which the presser-bar is secured and released at desired intervals. Fig. 5 is a side elevation of the needle-lever and cam for working the needle-lever, also showing pivot-post upon and over which the lever is pivoted. Fig. 6 is a front elevation of end of needle-lever, showing the manner of securing the needle and awl to the lever. Fig. 7 is a sectional-elevation plan of the end of needle-lever and cam, showing the variations of depth in the cam-groove by which a transverse or radial motion is imparted to the lever. Fig. 8 is a vertical section on line $x\ x$, Fig. 3, of frame-work, and showing the side elevation of the mechanism by which the shuttle is operated. Fig. 9 is a front elevation of the mechanism shown in Fig. 8. Fig. 10 shows the shuttle-driver. Fig. 11 is a side elevation of disk having cam-groove for working the needle-lever. Fig. 12 is a front elevation of the shuttle race or carrier. Fig. 13 is a central vertical section of Fig. 12. Fig. 14 is a front view of shuttle. Fig. 15 is a side view of shuttle. Fig. 16 is a plan of lever or arm to which the presser-foot is attached. Fig. 17 is a side elevation of Fig. 16.

Figure 20:
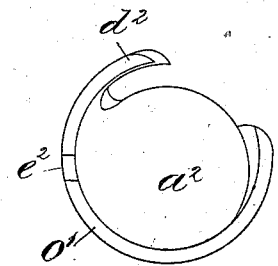
Figure 21:
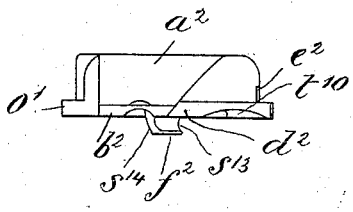
Figure 22:
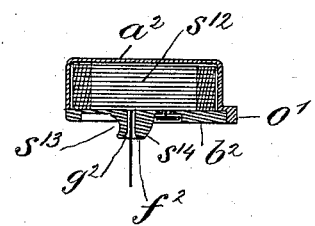

Fig. 18 is a plan of needle-plate, and Fig. 19 is an end elevation of the same. Fig. 20 is a back view of the shuttle shown in Fig. 14. Fig. 21 is a plan of shuttle shown in Fig. 14. Fig. 22 is a cross-section of shuttle.

Letter A is any suitable base, on uprights B of which is carried an upper frame, C, provided with eyes D, forming bearings for the main shaft E to revolve in by power applied to any suitable wheel secured on the extended end of said shaft. On this shaft are secured the cams which cause the principal motions. These I will now describe in regular order, and give as far as conveniently can be the description of the other parts relating thereto.

F (see Figs. 1, 3, 5, 7, and 11) is the disk by which the needle-lever is operated. It is provided with a cam-groove, G, in which a friction-pulley, H, secured on the end of the needle-lever I, runs by the revolving of the shaft E and disk F. The pivot by which H is attached to the needle-lever I is provided with a button-shaped head, K, to bear upon the bottom of the groove G, which has two depths, (see Fig. 7,) so that by causing K to bear continuously upon the bottom of the groove G, the lever I is caused to vibrate or have a radial motion, as indicated by the dotted lines in this figure. The section of the cam shown in Fig. 7 is taken on line $yy$, Fig. 11. The less depth of the part of the groove extends from about 2 to 3 and the greater depth from about 1 to 4. (See Fig. 11.) The intermediate spaces are the inclines from one depth to the other.

L is a vertical bearing (see Figs. 3, 5, and 8) formed in C, in which, and in a foot-bearing, M, the pivot-shaft N is supported and free to turn on its axis. It is terminated by a broad double eye, O, which receives within it the eye P of the lever I, the two being attached together by a pin, R.

N' is a slip-collar, secured by a pin to keep N in place.

To one side of O an arm, S, is formed in one with it. To this is attached a strong spring, T, the other end of which is made fast on a projection on C. By the action of this spring the button-head K is kept pressed down on the bottom of the groove G, when the longest stitch which the machine is constructed to make is used. When a shorter stitch is required, the set-screw V is adjusted so that it holds K the desired distance off the lower part of the groove, or, in other words, reduces the vibrations of I in the one direction, and this screw might be screwed so far in as to prevent the said vibrations altogether.

Having thus described the motions of the needle-lever and all the parts connected therewith, it only remains to describe the attachment of the needle and awl, or the needle only, if such be used alone. (See Figs. 1, 2, 5, and 6.)

To the lever I is attached by screws $a$ a jaw or vise-piece, $b$. This and the lever I are each provided with a crease to hold the shank of the needle $c$ and awl $d$, a strip or supplementary piece, $e$, being inserted between them to set them apart the required amount for the length of stitch that the lateral motion of I has been adjusted to. If a needle only is to be used it will be simply grasped between I and $b$. The object of using a needle and awl is that the awl may first pierce the hole into which the stitch is to be made. This enables a much finer needle to be used with a given-sized thread, because of the springing of the needle on account of its configuration and length; also, the awl relieves the needle from the strain which the lateral movement of the lever I would cause upon it when feeding. In doing some classes of work a needle only may be employed; but when the machine is employed upon "fair stitching," it will be found, as a general thing, that the employment of the needle and awl is a great improvement over the use of the needle only.

I will now describe the needle-thread take-up lever, its motion, and parts connected therewith. (See Figs. 1, 2, and 4.)

$f$ is a bracket, seated upon C, and secured thereto by screws $g$. To the upper end of this is pivoted at $h$ a rock-shaft, $i$, having an arm, $k$, forming the thread-lever, and an arm, $l$, to which is pivoted a friction-pulley, $m$. This pulley runs in the cam-groove $n$ in the disk $o$, secured and revolving with the shaft E, thus imparting the desired motion to the arm $k$.

$p$ is the eye through which the thread is passed, and $q$ is a spring through the eye, at the end of which the thread is also passed for the purpose of supplementing the thread-lever and taking up any slack needle-thread. No tension is shown in the drawings, any suitable one being provided, and attached in any suitable position to act upon the needle-thread.

We now come to the shuttle-actuating mechanism, which is shown more or less in each of the Figs. 1, 2, 3, 8, 9, and 10.

On the shaft E is secured a drum, $r$, having a circumferential cam-groove, $s$, in which is received the friction-pulley $t$, attached on the end of a vibrating arm, $u$, pivoted upon a pivot-pin, W, secured in a block, $a'$, attached to the bed A. In $a'$ is also formed a journal-bearing to receive the end of the shaft $b'$, which extends forward and is carried at its front extremity in a journal-bearing formed in an upright, $c'$, extending from the front portion of the base A. On the shaft $b'$ is secured an arm, $d'$. Each of the arms $u$ and $d'$ is provided with a pin, $c^2$, to receive a connecting-link, $e'$, by which the vibrations of the arm $u$ are transmitted to the arm $d'$. By this means the shaft $b'$ is partially revolved.

$f'$ is a toothed segment and arm, secured on $b'$, and caused to vibrate with its motion. The teeth of the segment intermesh with a gear-wheel, $g'$, secured on a spindle, $h'$, passing through a deep journal formed in the upper part of $c'$. On the end of the spindle is formed a disk, $i'$, having a clutch-projection, $k'$, which engages with the shuttle, as hereinafter described. Now, by the operation of the parts above described, the disk $i'$ is caused to make about three hundred and fifty degrees of a revolution at each motion of $f'$. Therefore the shuttle will make a similar amount of revolution, less a trifling amount of lost motion in the connection.

The shuttle race or carrier consists of a block, $l'$, attached to $c'$ by having its bottom edge engaging with a projection of it, in the manner clearly shown in Fig. 8, and by any ordinary arrangement of set-screws (not shown) the upper part may be adjusted slightly backward and forward to the exact position desired. In $l'$ a circular opening, $m'$, is formed, so situated that when $l'$ is in place, as above described, the opening will be concentric with the disk $i'$. In the enlarged portion $n'$ the rim $o'$ of the shuttle revolves by the engagement of the clutch-projection $k'$, which is indicated by a heavy black line, $k'$, in Fig. 14. The shuttle consists of a rim, $o'$, having a cylindrical box, $a^2$, attached or made in one with the said rim. This box receives the cop of thread $s^{12}$ for sewing. In Fig. 14 the lid $b^2$ of the box $a^2$ is shown, the box being immediately behind the lid, which is hinged at $e^2$ to $o'$. On $o'$ is formed a projection or hook, $d^2$, for taking hold of or hooking into the needle-thread. On the front of $b^2$ is provided a face-cam, $f^2$, having a hole, $g^2$, through which the shuttle-thread issues. The face-cam $f^2$ is a projection on the center of the lid $b^2$, having a concave surface, $s^{13}$, extending about half the circumference, and a convex surface, $s^{14}$, extending the remainder of the circumference. By this arrangement and peculiar construction of the face-cam $f^2$, when the needle-thread is engaged by the hook $d^2$, and by it drawn down the needle-thread is pushed outward from the face of the shuttle or the lid $b^2$ by the convex part $s^{14}$, until the shuttle has so far revolved as to release the needle-thread. The needle-thread, being then drawn up by the thread-lever $k$, falls into a recess formed in the lid $b^2$ at $s^{15}$ and engages the shuttle-thread, which shuttle-thread falls into the concave part $s^{13}$, and is thereby prevented from being caught or fouled by the hook $d^2$ during the return semi-revolution of the shuttle. The depressions $t^{10}$ and $t^{11}$ are for the purpose of giving the threads a little more free space in passing the shuttle.

$f^9$ are tension-holes, and $f^{10}$ a tension-spring of ordinary construction, by the use of which in the ordinary way the required tension on the shuttle-thread may be obtained.

In front of the shuttle-carrier $l'$ is hinged a door or cover, $h^2$, provided with a recess, $k^2$, (see Fig. 8,) to give further space in front of the shuttle. This door is secured when shut, as in the said figure, by any suitable form of latch or catch. The upper portion of $l'$ is partly cut away, as at $i^2$, (Figs. 12 and 13,) to form an opening with the space $k^2$ for the needle to pass into the shuttle-chamber or space $m'$. $l'$ is provided with side strips, $m^2$, for causing the door $h^2$ to come always exactly to its proper place when shut.

$A^2$ is the needle-plate or bed-plate. It is of the configuration shown in Figs. 8, 18, and 19, provided with an opening, $n^2$, through which the needle passes. At each end of this opening upward projections $o^2$ are formed. The object of the configuration of the needle-plate is to follow the channel or groove which is formed in the work to be stitched. $A^2$ is placed on a bed, $A^3$, (see Fig. 3,) and secured in place by dovetailing its edges and a tap-screw passing through the opening $p^2$ and screwed into $c'$ at $q^2$.

I will now describe the presser-foot and parts connected therewith. These are shown by Figs. 1, 2, 3, 4, 16, and 17.

$a^3$ is an arm, provided with journals $b^3$ and $c^3$. The journal $b^3$ is received within the eye-bearing $d^3$, secured on C, and the journal $c^3$ is received within a journal-bearing formed for it in $f$. (See Fig. 2.)

$e^3$ is a lever, the eye or fulcrum of which is pivoted upon $c^3$, between $a^3$ and $f$. It is secured to the arm $a^3$ by a screw, $f^3$, so that by pressing on the back end of the lever the arm $a^3$ may be raised when desired. On a projection, $g^3$, of $a^3$ is secured by a screw, $A^4$, the presser-foot $h^3$, provided with an opening, $i^3$, situated to come fairly over the opening $n^2$ in $A^2$.

$l^3$ is an opening formed in the neck of $h^3$ and projection $g^3$, to allow the end of the eye $m^3$, (see Fig. 2,) to pass through $g^3$ and $h^3$, as shown in dotted lines, and receive upon it a nut, $n^3$. This eye connects with a vertical spindle, $o^3$.

$B^2$ is a guard adjustably secured on $a^3$ by screws. This is to prevent the outward spring of the awl and needle when very hard material is worked upon.

In Fig. 3 the spindle $o^3$ is removed, showing the upper bearing, $p^3$, which it slides up and down in, and a bearing, $q^3$, formed for it in the base A. At an intermediate position this spindle passes through a double eye, $r^3$, to which is pivoted, by a pin, $s^3$, a lever, $t^3$, operated by a cam, $a^4$, secured on the shaft E, and by a spring, $b^4$. (See Figs. 1, 2, 3, and 4.) The end $c^4$ of the lever $t^3$ is fitted to the spindle $o^3$ to form a gripping-surface, so that when the lever $t^3$ is allowed to come to its lowest position by the revolving of the cam $a^4$ the end $c^4$ grips the spindle $o^3$ and holds it rigidly in whatever position it may be in at the time $c^4$ grasps it. To the end of $o^3$ is attached a strong spring, $d^4$, which at all times endeavors to draw and keep down the spindle $o^3$, and which it would do were not means provided by which the spindle is raised. When the spindle $o^3$ is drawn down the nut $n^3$ is caused to bear upon the presser-foot $h^3$, drawing it down also upon the work placed under it and between it and the needle-plate $A^2$. From this it will be understood how the material to be stitched is grasped. (See Figs. 2, 8, 18, and 19.) Now, as the work has to be moved forward after each stitch the amount of the next stitch it becomes necessary that the presser-foot should be released sufficiently to enable the awl and needle, or the needle only, as the case may be, to slide the work along between the parts $h^3$ and $A^2$.

The mechanism by which the raising of the spindle $o^3$ is caused is as follows, (see Figs. 2 and 3:)

Pivoted to a double eye, $a^5$, (shown partly by dotted and partly by full lines in elevation in Fig. 2,) is a lever, $b^5$, provided with a friction-pulley, $c^5$, which engages with a cam, $d^5$, secured on the shaft E. The lower end of the lever is provided with a toe, $e^5$, which engages with a plate, $f^5$. This plate is provided with an opening close-fitting upon the spindle $o^3$, but free to slide thereon when the plate is at right angles to the spindle. By the raising of the toe $e^5$ the plate is caused first to clamp upon the spindle, and by the further raising of the toe the spindle is obliged to rise with it, as shown in Fig. 3, and thus release the work being stitched.

$g^5$ is a plate which serves as a retaining or distance fulcrum to the plate $f^5$.

$h^5$ and $i^5$ are springs to insure the return of the plate $f^5$ after it has been raised, and, furthermore, keep the pulley $c^5$ pressed up against the periphery of the cam $d^5$. The springs $d^4$ and $i^5$ are attached upon any suitable portion of the stand upon which the machine is secured, or upon any attachment of the same. When the spindle $o^3$ is raised the presser-foot is released from the action of the spring $d^4$; but that there may be at all times a slight downward pressure upon the presser-foot $h^3$, a spring, $k^5$, is attached between a projection, $l^5$, on $c'$, and a projection, $m^5$, on $g^3$. (See Figs. 2 and 16.) This spring $k^5$ is not of such force as to prevent the awl or needle, as the case may be, from moving the work along between $o^3$ and $h^3$.

Whenever it is desired to completely remove all pressure from the work and raise the presser-foot, it is only necessary to set the machine in the position shown in Fig. 2, and then depress the back end of the lever $e^3$, either by hand or by any ordinary and suitable attachment to the lever $e^3$. It may be depressed by the foot.

A consideration of the above parts will show that the presser-foot will adjust itself to various or varying thicknesses of material according as the same pass or are placed under it, without varying the actions of the parts except that they perform their functions in a slightly higher or lower position.

The cam $d^5$ will be timed to relieve the work just before the feeding motion of the lever I begins. The shuttle will be timed so that the projection $d^2$ passes through the loop of needle-thread, formed by the needle when the needle has come down to the lowest point of its stroke, and, by reason of the configuration of the cam-groove G, the needle is caused to slightly rise and "bag" or open the loop of needle-thread, after which the needle remains stationary for a small interval, during which the projection $d^2$ hooks into the needle-thread.

It is intended to use threads, waxed or not, with this machine, depending on the class of work upon which it is employed. Therefore suitable means will be employed for heating the various parts of the machine and threads when wax is used. These means, forming no part of the present invention, have not been shown in the drawings. Neither do I consider it necessary to describe them in this specification.

What I claim, and wish to secure by Letters Patent, is as follows:

1. The combination of a revolving body having a cam-groove, G, of varying depth and configuration, as shown and described, with a needle-lever provided with a needle, the said groove being thus adapted to impart vertical and lateral movements to said needle-lever, substantially as described.

2. The combination of the cam-disk F, provided with cam-groove G, of varying depth, lever I, provided with roller H and button-head K, pivot-post N, and spring T, substantially as and for the purposes set forth.

3. The lever I, actuated by a cam-groove, G, to give it two motions, as described, with needle $c$, and awl $d$, presser-foot $h^3$, and needle-plate $A^2$, combined substantially as and for the purposes described.

4. The combination of the lever I, actuated by a cam-groove, G, to give it two motions, as described, with needle $c$, presser-foot $h^3$, and needle-plate $A^2$, substantially as and for the purpose set forth.

5. In the construction of revolving shuttles, the combination of a revolving chamber or box, $a^2$, provided with a hook, $d^2$, and face-cam $f^2$, provided with surfaces for alternately drawing the threads toward and pushing them out from the front of the chamber $a^2$, substantially as described and shown.

6. The combination of the plate $A^2$, presser-foot $h^3$, the latter being attached on a pivoted arm, a vertical spindle, $o^3$, attached to said arm and connected therewith, as described, plate $f^5$, and levers $b^5$ and $t^3$, operating said spindle, as set forth, the whole substantially as shown and described.

7. The combination of a needle-thread take-up lever, operated as described, with a needle having a motion transverse to its stitching motion, as described, and with a shuttle provided with a hook, $d^2$, and projection $f^2$, and reciprocating revolving motion, substantially as set forth.

MARSHALL HENRY PEARSON.

Witnesses:
BENJAMIN ROBERTSHAW BURRELL,
*Leeds, England, Solicitor,*
ALFRED WHITE,
*His Clerk.*